United States Patent [19]

Henderson

[11] Patent Number: 5,419,863
[45] Date of Patent: *May 30, 1995

[54] METHOD OF MAKING A SEAMLESS BACKFILLED MOLDING

[75] Inventor: Jack V. Henderson, Bloomfield Hills, Mich.

[73] Assignee: The Standard Products Company, Cleveland, Ohio

[*] Notice: The portion of the term of this patent subsequent to Jul. 13, 2010 has been disclaimed.

[21] Appl. No.: 847,330

[22] Filed: Mar. 6, 1992

[51] Int. Cl.$^6$ ............................................. B29C 45/16
[52] U.S. Cl. .................................... 264/148; 264/145; 264/266; 264/275; 264/296; 156/211; 428/31
[58] Field of Search .............. 264/145, 148, 162, 255, 264/265, 266, 275, 277, 296, 328.1, 250; 156/153, 211, 244.18; 428/31

[56] References Cited

U.S. PATENT DOCUMENTS

| | | | |
|---|---|---|---|
| 2,290,249 | 7/1942 | Piperoux | 264/278 |
| 3,245,864 | 4/1966 | Shanok et al. | 264/171 |
| 3,451,709 | 6/1969 | Swauger | 428/31 |
| 3,458,386 | 7/1969 | Shanok et al. | 428/31 |
| 3,969,172 | 7/1976 | Hotton | 156/211 |
| 3,970,498 | 7/1976 | Loew | 156/211 |
| 4,052,522 | 10/1977 | Narita | 428/31 |
| 4,094,056 | 6/1978 | Takeda et al. | 72/46 |
| 4,120,628 | 10/1978 | Simos | 264/241 |
| 4,246,303 | 1/1981 | Townsend | 428/31 |
| 4,277,526 | 7/1981 | Jackson | 428/31 |
| 4,298,640 | 11/1981 | Katoh | 428/31 |
| 4,318,764 | 3/1982 | VanManen | 264/271.1 |
| 4,376,748 | 3/1983 | van Erven | 264/255 |
| 4,497,763 | 2/1985 | Monnet | 264/255 |
| 4,515,649 | 5/1985 | Nussbaum | 156/244.11 |
| 4,546,022 | 10/1985 | Madonia et al. | 428/31 |
| 4,600,461 | 7/1986 | Guy | 156/244.12 |
| 4,619,847 | 10/1986 | Jackson | 264/248 |
| 4,631,104 | 12/1986 | Jackson | 428/31 |
| 4,654,238 | 3/1987 | Yamazaki et al. | 428/31 |
| 4,778,550 | 10/1988 | Barton et al. | 156/211 |
| 4,911,959 | 3/1990 | Miyakawa | 428/31 |
| 4,965,103 | 10/1990 | Roberts et al. | 428/31 |
| 4,978,490 | 12/1990 | Jackson | 264/263 |
| 4,999,227 | 3/1991 | Vander Togt | 428/31 |
| 5,194,305 | 3/1993 | Shirahata et al. | 428/31 |
| 5,227,108 | 7/1993 | Reid, Jr. et al. | 264/266 |

FOREIGN PATENT DOCUMENTS

| | | | |
|---|---|---|---|
| 0061132 | 9/1982 | European Pat. Off. | 428/31 |
| 0249592 | 12/1987 | European Pat. Off. | 264/266 |
| 2047213 | 3/1972 | Germany | 156/211 |
| 60-47742 | 3/1985 | Japan | 428/31 |
| 62-99122 | 5/1987 | Japan | 264/266 |
| 1279846 | 6/1972 | United Kingdom . | |
| 1428811 | 3/1976 | United Kingdom . | |
| 1428812 | 3/1976 | United Kingdom . | |
| 1545511 | 5/1979 | United Kingdom . | |
| 2097710 | 11/1982 | United Kingdom . | |

*Primary Examiner*—Jay H. Woo
*Assistant Examiner*—Robert B. Davis
*Attorney, Agent, or Firm*—Harness, Dickey & Pierce

[57] ABSTRACT

A molding having an attractive end portion or other portion with a formed contour is provided by the steps of providing an extruded elongated molding. Thereafter a portion of the molding is removed for forming a cavity. A second core material is injection molded into the cavity while reshaping the molding to a desired shape. A molding of the present invention has a first core with a relatively thin skin extruded thereover and a second core material in a reshaped portion of the molding. Alternatively, a molding can be made from a solid extrusion with a replacement of a core of the solid extrusion at a portion of the molding to be reformed.

11 Claims, 5 Drawing Sheets

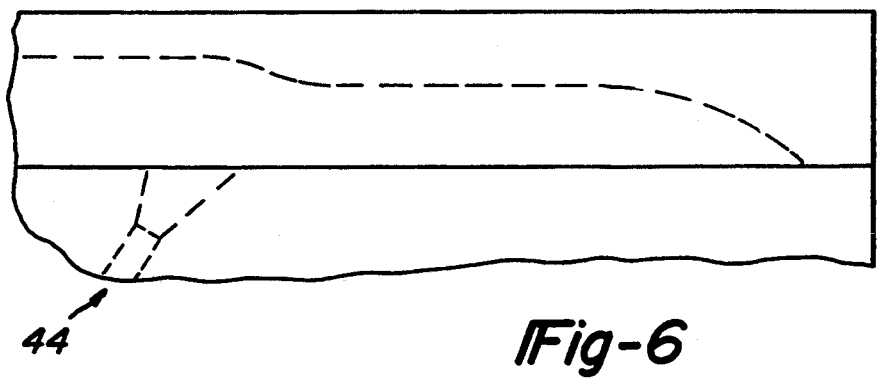
Fig-6
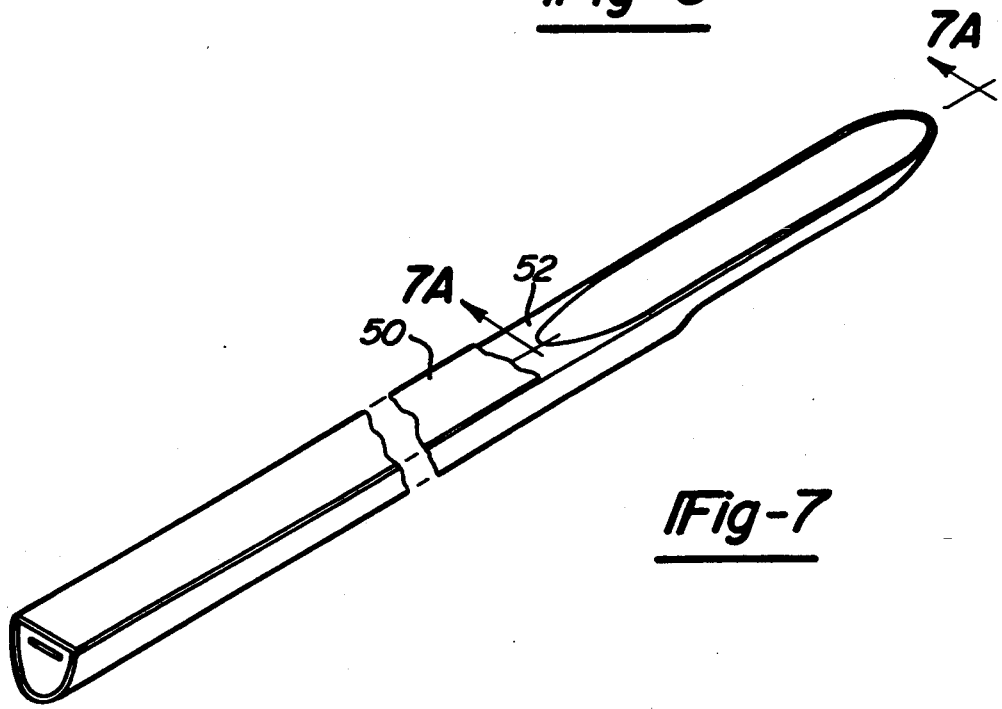
Fig-7
Fig-8
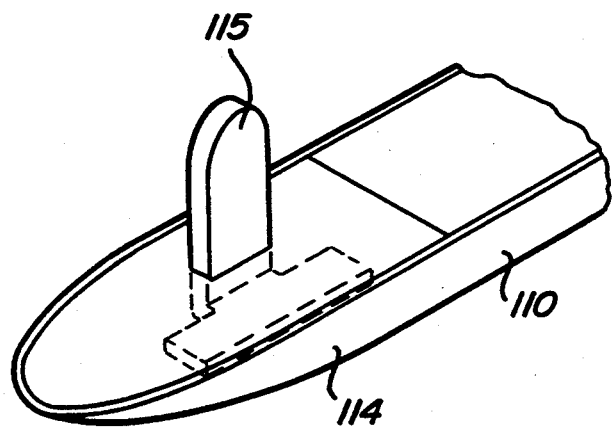

METHOD OF MAKING A SEAMLESS BACKFILLED MOLDING

BACKGROUND OF THE INVENTION

The present invention relates to extruded elongated molding structures. More particularly, the present invention relates to body side moldings for use on vehicles.

Body side moldings for automotive vehicles are installed in discrete lengths with ends allowing for the opening of doors and the like. It has been problematic in the art to provide ends and other curved body conforming portions in an economical fashion, yet which have a pleasing appearance. A common method of providing ends on body side moldings is to mold a separate end on each length of molding. U.S. Pat. Nos. 3,959,172; 3,970,498; and 4,778,550 disclose such methods. This method, however, suffers the disadvantage of providing a joint line between the end and length of molding which detracts from the appearance of the molding as a whole. The disadvantageous appearance problems with such molding constructions become increasingly apparent when high gloss show surfaces are provided in these moldings. In recent years there has been an increasing demand for high gloss and even color match moldings for vehicles which do not show joint lines or other minor surface imperfections. Thus, there remains a need for an improved method of providing an end for moldings and for such improved moldings themselves.

While prior U.S. Pat. No. 4,978,490 creates good part qualities with injection molding techniques extrusion techniques are much more cost effective. Additionally, it is somewhat problematic to achieve the high quality surfaces desirable in trim parts utilizing injection molding technologies. These techniques also require purging of colored resins from the injection molding machine prior to manufacturing a new color part which is costly both from a production and materials standpoint. It is therefore desirable to provide a process for forming contoured show surface quality moldings utilizing extrusion techniques.

SUMMARY OF THE INVENTION

In accordance with the present invention a molding having an attractive end portion or molded contour is provided by the steps of:

(A) providing an elongated molding;
(B) removing core material from a portion of said molding leaving a thin skin portion;
(C) providing a mold having a mold cavity for forming a predetermined final shape of a finished molding; and
(D) placing said molding into said cavity and injection molding a new core material into said end portion and shaping said skin to a desired shape during the injection molding step.

A molding of the present invention has a first core with a relatively thin skin extruded thereover and at least a portion thereof with a second core material and a shaped relatively thin outer skin.

Further understanding of the invention will be had from the following disclosure taken in conjunction with the drawing and accompanying claims.

BRIEF DESCRIPTION OF THE DRAWINGS

FIG. 6 is illustrative of the injection molding step of the present invention;

FIG. 7 illustrates a molding of the present invention with the finished end portion;

FIG. 8 shows an end portion of the present invention with an optional fastening means;

DESCRIPTION OF THE PREFERRED EMBODIMENTS

Figure 1:
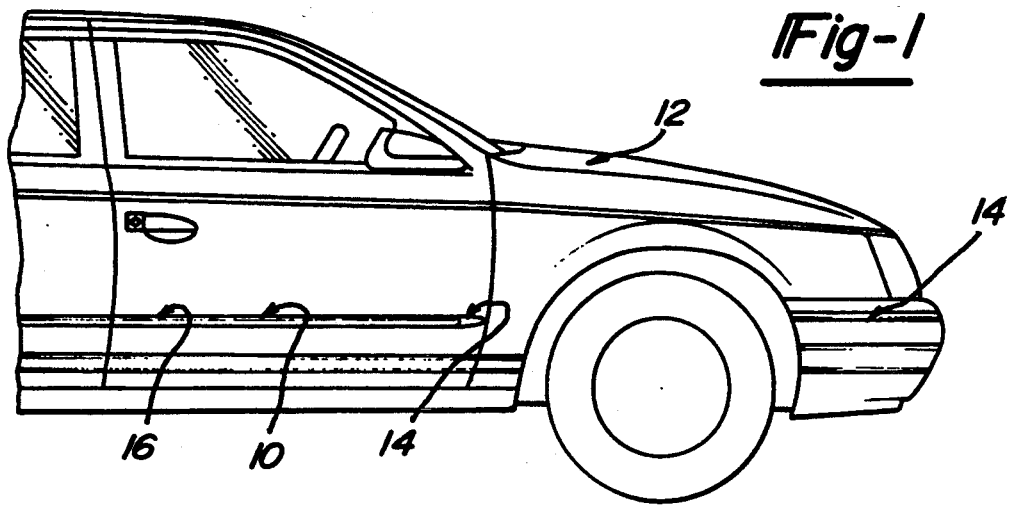
FIG. 1 is a side elevation of an automobile, broken away, with a molding of the present invention shown installed thereon.

Now referring to the figures, FIG. 1 shows a first embodiment of a molding 10 of the present invention installed on an automotive vehicle 12. Molding 10 has end portions 14 and 16 which are produced in accordance with the following method. It will be readily appreciated by those skilled in the art in light of the teachings below that the process of the present invention can be utilized to provide a contour in a molding or otherwise provide contours, ends or other shapes in a final molding.

Figure 2:
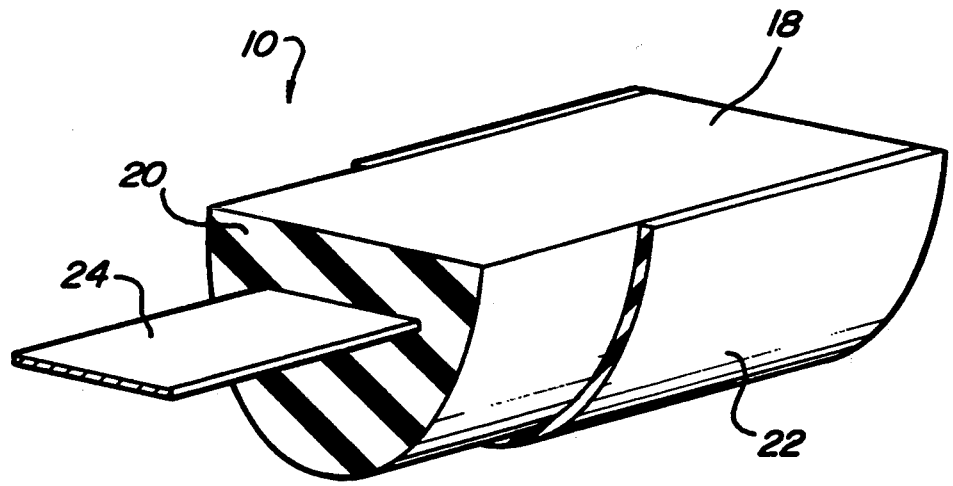
FIG. 2 is a perspective view with portions broken away of a central portion of a molding of the present invention.

In accordance with the first step of the present invention and as illustrated in FIG. 2, an elongated molding 10 has a back portion 18 on a core 20 and a relatively thin thermoplastic skin 22 thereover. Both core 20 and skin 22 can be made of, for example, polyvinyl chloride material with a 70–80 shore A durometer. Other thermoplastics which may be utilized include urethanes and polyolefins. Both core 20 and skin 22 will generally be extruded materials and, for example, are preferably coextruded in a single operation. In a preferred embodiment core 20 may be made from a relatively less expensive PVC material than skin 22 which must include the show surface qualities of the molding. Thus, the skin material is preferably a more expensive or attractive color matched or otherwise pigmented PVC material which includes the desirable final finish characteristics of the part. Preferably, a PVC extrudate having a shore "A" hardness of 80–95 durometer is utilized.

In an alternate embodiment a metallized mylar film could be embedded in a clear plastic skin material which could be utilized as the outer skin to provide a metallic appearance to the final part. The formation of the end portion or contour would be accomplished in the same manner as set forth herein.

Molding 10 can also be provided with an aluminum shrink stabilizer strip 24 embedded within core 20 preferably on the neutral axis thereof and to provide length stability thereto. However, other configurations of shrink stabilizers could be utilized in the present invention. For instance, it may be preferable in some applications to have the shrink stabilizer strip 24 attached to the back 18 of the molding or the shrink stabilizer could be embedded through other portions of the molding.

Molding 10 is then cut to a rough length desired for the particular use of the molding. By the term rough-length is meant that a length of molding 10 is cut to the approximate but slightly oversized length desired for a predetermined molding for a location on a vehicle. For instance, a length could be cut for a vehicle door of a particular model vehicle. It is generally necessary that the length is oversized to compensate for trimming operations necessary for final end forming. To provide accurate length and tooling control, a master tooling hole can be drilled proximate the end of length of molding 10 to provide accurate measurements for the later processing steps.

Figure 3:
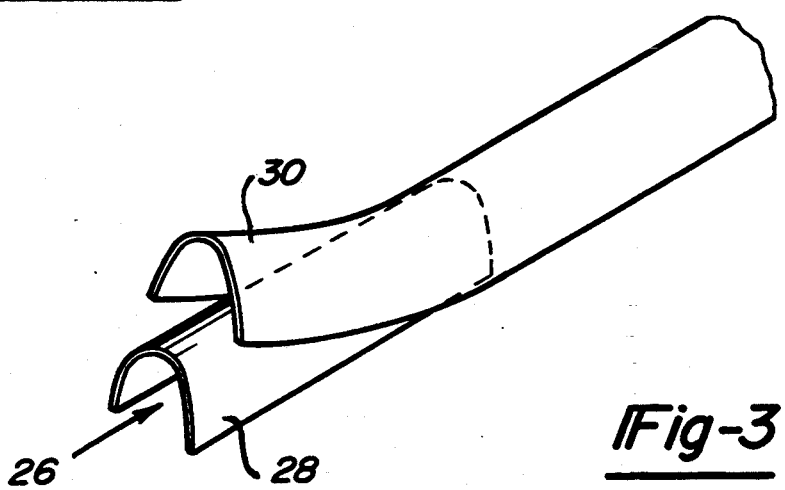
FIG. 3 is a perspective view of a cutting blade separating a skin from the core material.

Then, and as best illustrated in FIG. 3, an end portion 26 of core 20 is removed by, for example skive cutting, milling, or grinding leaving the skin in tact. As illustrated in FIG. 3, a cutting blade 28 is used to make a longitudinal cut into molding 10 thus removing end portion 26 of core 20 and leaving an end portion 30 of skin 22. The end portion 30 of skin 22 can be sized, for example, to have a thickness of 0.040 inches at the crown and 0.060 inches on the side. In a preferred embodiment, the end portion 30 of skin 22 is sized thick enough so that one cannot see through the skin to the inner core portion. This is to guard against any read-through of the core color through the skin. However, in some situations it may be desirable to have a clear skin over a colored core for aesthetic effects. This can also be accomplished in the present invention if desired.

Figure 4:
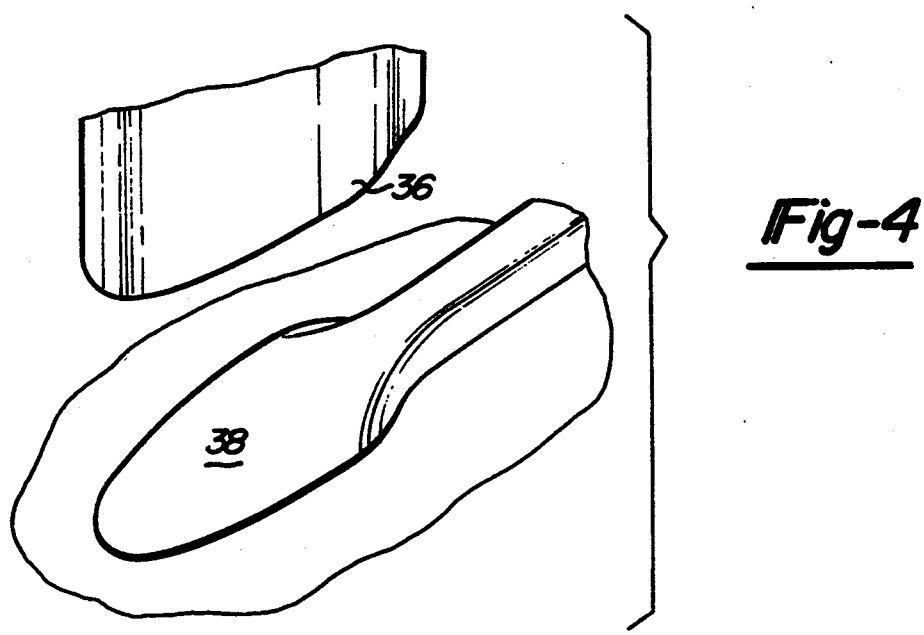
FIG. 4 is a perspective view illustrating a cutting blade device utilized to cut the material to a desired shape.

After skiving or otherwise removing the end portion 26 of core 20, end portion 30 of skin 22 is subjected to a cutting step as shown in FIG. 4. The cutting step preferably forms the end to provide a suitable final contour in the finished part. Thus, a die cutting blade 36 can be employed in a transverse direction to cut a flattened out end portion 30 of skin 22 to provide a desired final skin profile shape thereto.

Figure 5:
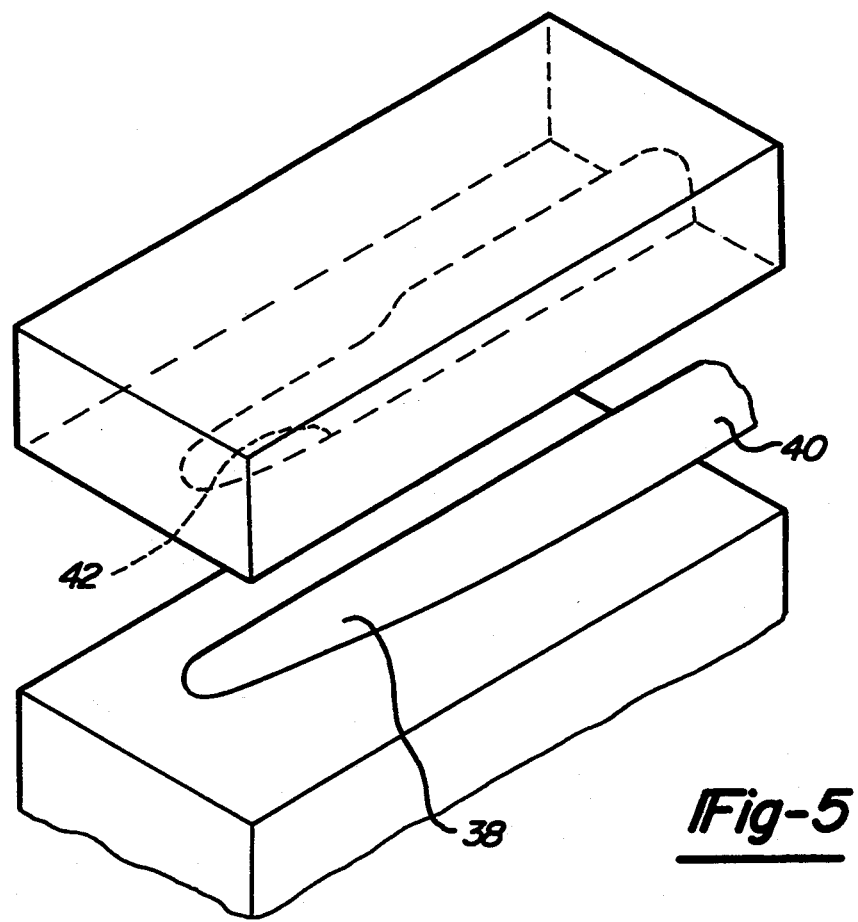
FIG. 5 is a perspective view illustrating the molding step for final preparation and filling of the trim strip.
Figure 7A:
FIG. 7a is a sectional view of the molding of FIG. 7 taken along line 7a—7a of FIG. 7 showing the finished end portion in cross-section.
Figure 9:
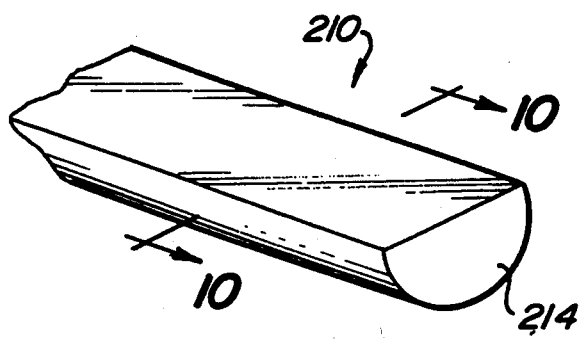
FIG. 9 is a perspective view of an alternate embodiment of the present invention.
Figure 10:
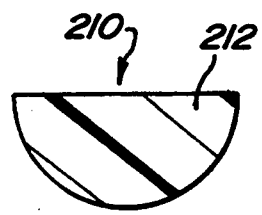
FIG. 10 is a sectional view taken along line 10—10 of FIG. 9.
Figure 11:
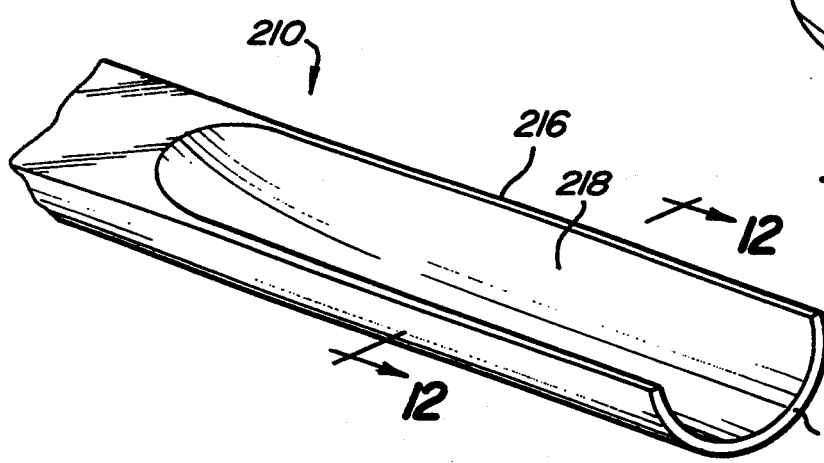
FIG. 11 is a perspective view showing removal of the material to form a hollow portion in the molding of FIG. 9.
Figure 12:
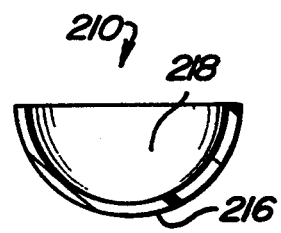
FIG. 12 is a sectional view taken along line 12—12 of FIG. 11.
Figure 13:
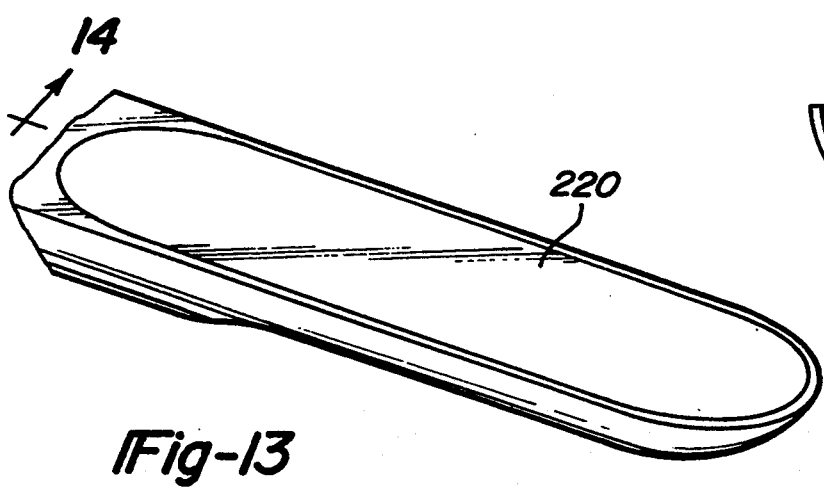
FIG. 13 is a view of a complete part.

Next, end portion 38 of molding 20 along with an adjacent proximate portion 40 of molding 10 is placed within a suitably configured final contour mold cavity 42 and as is shown in FIGS. 5 and 6 conventional injection molding techniques, including preferably a pre-warming step, are employed to inject a second core material 44 into the mold to thermoform the end portion 38 into the desired final shape. The skin portion being thermoplastic allows the end portion to be reformed to a desired step configuration as shown in FIGS. 7 and 7a.

This is accomplished through pre-heating the mold and forcing the reinforced thermoplastic behind the skin to force the skin into the shape of the mold, i.e. the final desired shape. Alternatively, the pressure of the heated structural thermoplastic injection behind the skin 22 in certain applications will be sufficient to thermoform the skin 22 to the final shape. The final shape of skin 22 including end portion 38 is obtained without any joint lines, thin spots or stretch marks to detract from the appearance of molding 18. A suitable second core material comprises a thermoplastic urethane reinforced with glass to control shrinkage. Any material which is thermoplastic and can be injection molded with controlled shrinkage and which is compatible with skin 22 so that it will heat bond thereto can be used. Suitable materials preferably include reinforced thermoplastics such as polyvinyl chlorides, urethanes, or other thermoplastics which include fillers such as glass fibers, calcium carbonate, mica talc or the like to provide structural rigidity to the final formed end portion so that it retains its finished contour.

Thus, the molding of the present invention includes a continuous skin along its length with no end lines or other aberrations which would affect the appearance of the finished molding.

Finally, if desired, a two-sided tape 50 can be attached to the underside 52 of molding 18 to provide attachment means for attaching and retaining or installing the molding 18 onto an automotive vehicle.

Now referring to FIG. 8, an alternative embodiment of the present invention is shown wherein a molding 110 has an end portion 114 with a mechanical attachment means 115 molded therein in the injection molding step of the present invention. As is known in the injection molding art a suitable cavity can be provided in the mold portion for such a fastening member to be inserted into the mold prior to final injection of the thermoplastic material. The structurally reinforced thermoplastic provides a firm connection for such a mechanical fastener at the molded end of the molding.

The mechanical attachment means could be of any desirable configuration or material. Other configurations could also be molded into this end portion such as a hole in the part for receiving a screw or a fastener such as a nut could also be molded in situ in the end portion. Such attachments could be made of metal, plastic or the like as may be desirable in a particular application.

Figure 14:
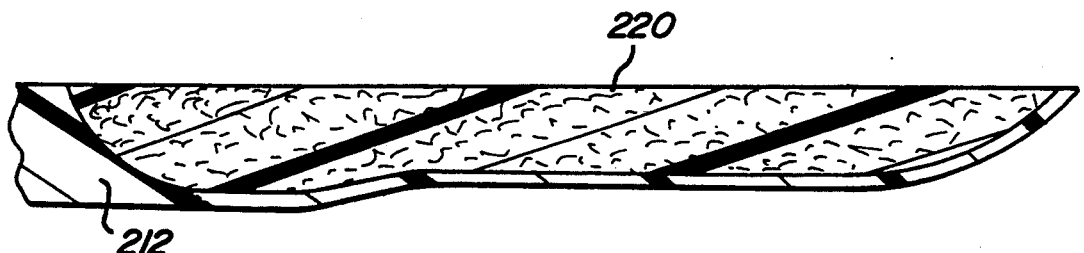
FIG. 14 is a sectional view taken along line 14—14 of FIG. 13.

Referring now to FIGS. 9–13, there is shown an alternate embodiment of a molding 210. This embodiment is substantially the same as that disclosed above, however, the extrusion is a one-piece strip made of a color match PVC material or the like. Molding 210 is a one-piece extrusion with a body 212 which is semi-circular in cross-section and an end portion 214. While molding 210 is shown to be semi-circular it will be readily appreciated by those skilled in the art that any number of cross-sectional shapes could be utilized provided there is sufficient thickness that a portion of the core may be removed. After extrusion and cutting to length, as set forth above in the previous embodiment, the end portion 214 is hollowed out to provide an outside skin 216 and an inner hollowed out cavity 218. Thereafter the end portion 214 may be die cut to a suitable shape placed in a suitable mold such as shown above. A reinforced structural thermoplastic is injected to fill hollowed out cavity 218 to provide a second core material 220. Referring to FIG. 14, the outside skin 216 of end portion 214 is shaped during the injection molding process and the cavity 218 is filled with a reinforced structured thermoplastic material 220. If desired, attachments may be provided in an end or the like as desirable or required in a particular application.

Figure 15:
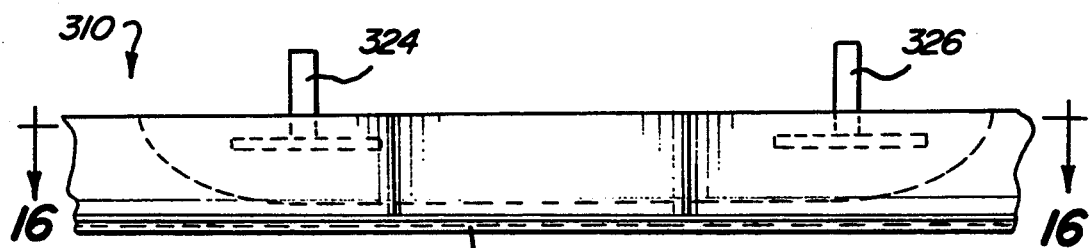
FIG. 15 is a plan view of an intermediate portion of a molding which is shaped in accordance with the teachings of the present invention.
Figure 16:
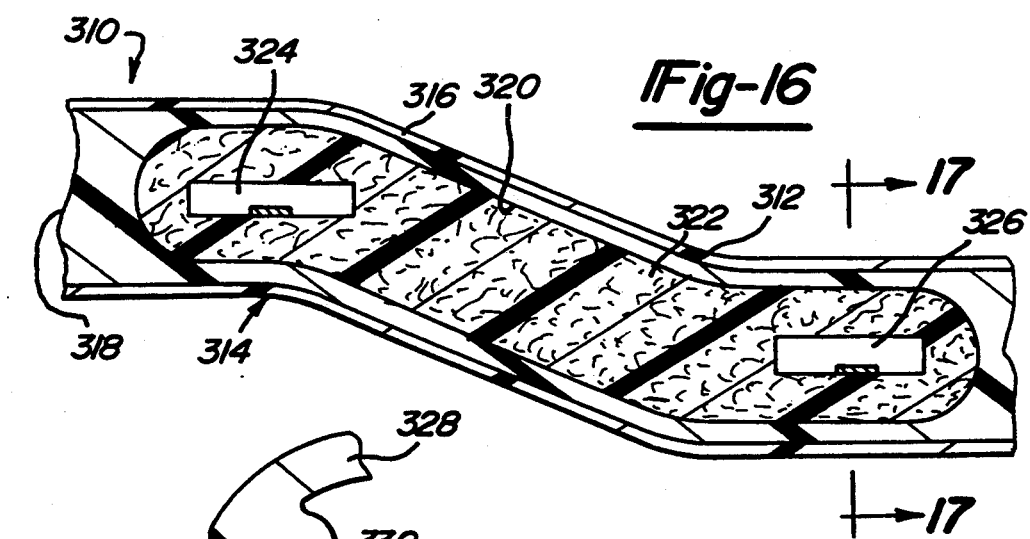
FIG. 16 is a sectional view taken along line 16—16 of FIG. 15.
Figure 17:
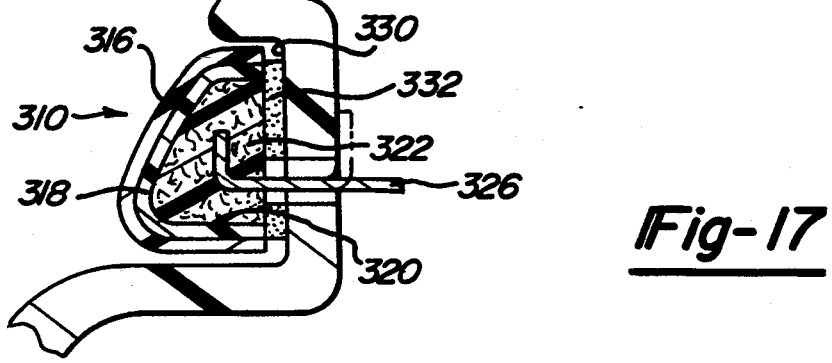
FIG. 17 is a sectional view taken along line 17—17 of FIG. 16.

Referring now to FIGS. 15-17, there is shown an alternate embodiment of a trim molding 310 made in accordance with the teachings of the present invention wherein an intermediate portion of a trim strip is formed to provide a pair of contour forming bends generally indicated at 312 and 314. This embodiment includes an outer show surface quality skin 316 extruded over a flexible thermoplastic core extrusion 318. The initial extrusion is performed to provide a straight extrusion product like that shown in FIG. 2, however, in this case no shrink stabilizer is shown. A portion of the core extrusion 318 is removed to form a cavity defined by surface 320 in the core extrusion 318. The cavity may be as deep or as shallow as may be required or desirable in a particular application. Thereafter, the molding 310 may be placed in a suitable injection mold cavity for forming the desired contour in the final molding and the structural core material 322 is injection molded to fill the cavity. Of course, during the molding process it is necessary to thermoform the core 318 and skin 316 in the mold during this process to provide a reshaping of these areas in the final molding.

Because the core material 320 is a relatively stiff structural material the final contour of the molding is rigidly retained after completion of the molding steps. As in the other embodiments shrink stabilizers (not shown) and fasteners such as shown at 324 and 326 may be incorporated into this embodiment as desired.

As shown in FIG. 17, the molding 310 can thus be form fit into a fascia assembly 328 which has a channel 330 formed therein. As shown, attachment tape 332 may be utilized to attach the trim strip in the channel such that the bends 312 and 314 follow the contour of the channel 330. As shown, the fastener 326 may be bent over to mechanically lock the molding in the channel.

While the above description constituents the preferred embodiments of the present invention, it is to be appreciated that the invention is susceptible to modification, variation and change without departing from the proper scope and fair meaning of the accompanying claims.

What is claimed is:

1. A method of manufacture of a molding comprising the steps of:
    (A) providing an elongated molding said molding including a backing side and an outer continuous show surface said elongated molding made of a thermoplastic material;
    (B) removing a core material behind said outer continuous show surface from a portion of said molding;
    (C) providing a mold having a mold cavity with a predetermined desirable final configuration for a molding; and
    (D) placing said molding into said mold cavity and injection molding a new core material into said portion and thereby shaping said molding to a desired shape and reforming said portion into a desired finished shape without visible transition lines in said outer continuous show surface.

2. The method of claim 1 wherein step (b) further comprises said core material being removed such that a thin skin material is left on said molding.

3. The method of claim 1 wherein said elongated molding further comprises a thin show surface skin material extruded over a core material and wherein said core material is removed to the show surface skin material.

4. The method of claim 3 wherein an end portion of said molding is formed into a desired final configuration.

5. The method of claim 4 wherein said show surface portion and said core material are thermoplastics.

6. The method of claim 5 wherein said thermoplastics are selected from the group consisting of polyvinyl chlorides, polyurethanes and polyolefins.

7. The method of claim 6 further comprising the steps of placing an attachment member in said molding cavity prior to injection molding of said portion wherein the core material was removed and embedding into said portion an attachment member during injection molding of said new core material.

8. The method of claim 1 wherein said molding further comprises at least one end, said step of removing a core portion further comprises cutting said core from said core end thereby leaving a skin at said end and cutting said skin into a final configuration prior to inserting said end into said mold.

9. The method of claim 1 wherein said desired shape is formed along a length of said molding.

10. The method of claim 3 wherein said thin show surface skin is made of a polyvinyl chloride thermoplastic color matched to a predetermined finish of a vehicle.

11. The method of claim 3 wherein said new core is made from a reinforced thermoplastic material selected from the group consisting of polyurethanes, polyvinyl chlorides and polyolefins.

* * * * *